May 28, 1929.  C. M. GARDNER  1,715,195
RIM EXPANDING AND CONTRACTING DEVICE
Filed June 1, 1928  2 Sheets-Sheet 1
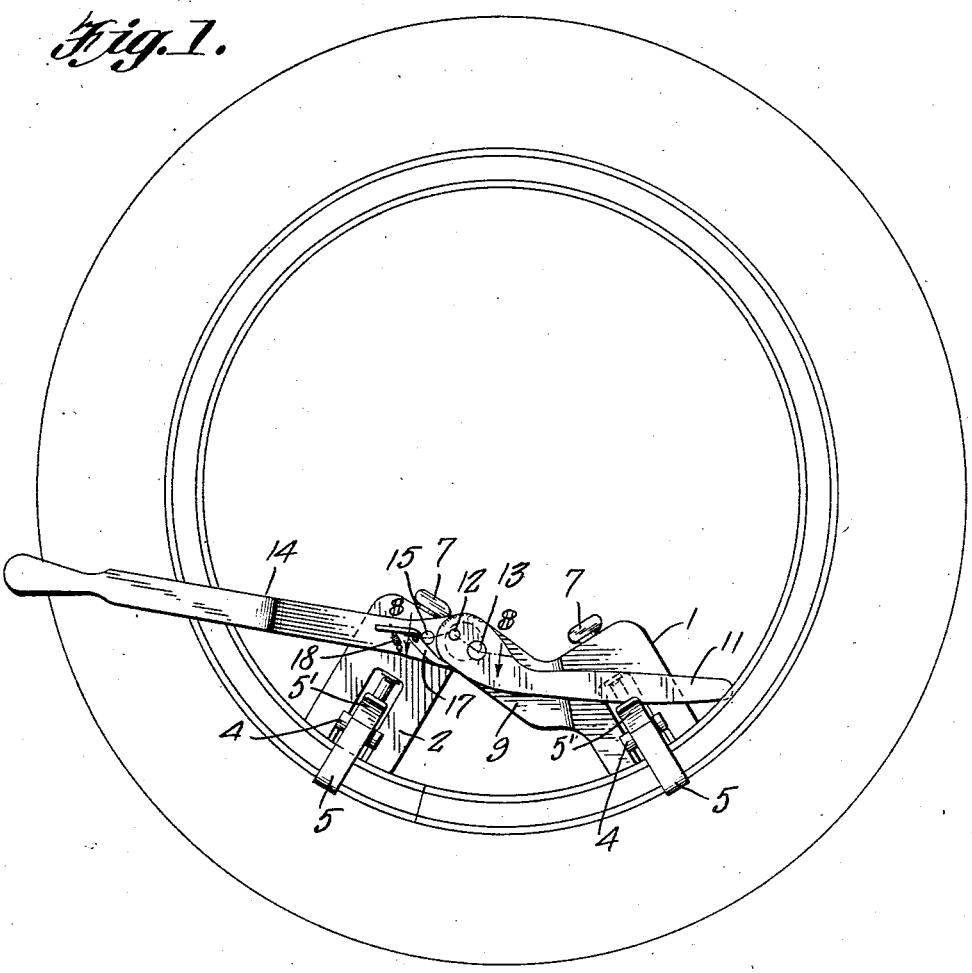
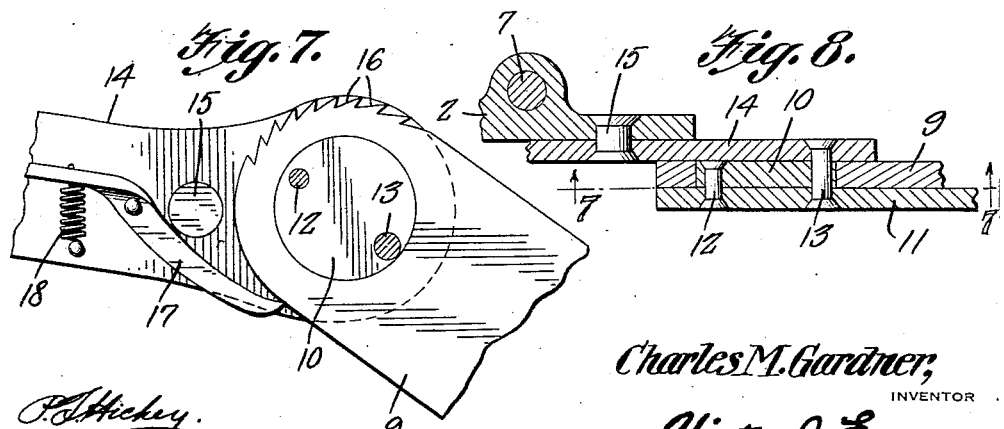
Charles M. Gardner, INVENTOR
BY Victor J. Evans ATTORNEY
WITNESS: P. J. Hickey.

May 28, 1929.　　　　C. M. GARDNER　　　　1,715,195
RIM EXPANDING AND CONTRACTING DEVICE
Filed June 1, 1928　　　2 Sheets-Sheet 2
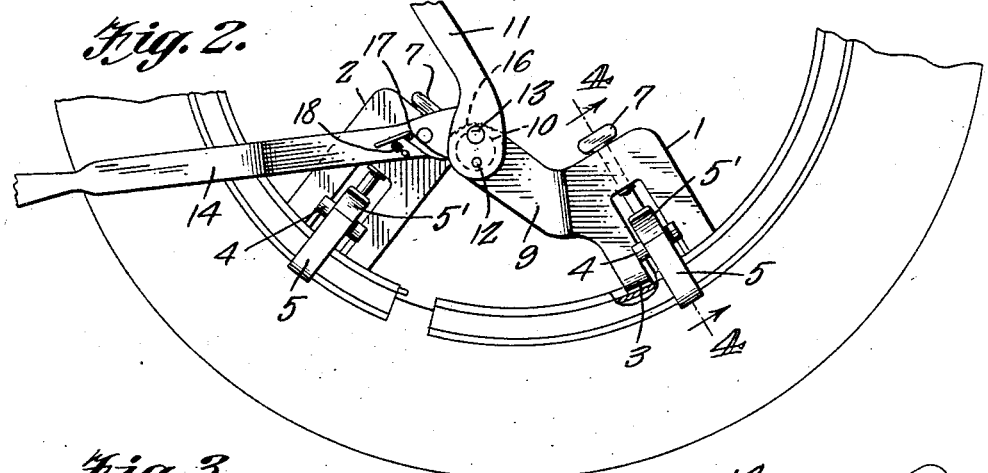

Patented May 28, 1929.

1,715,195

UNITED STATES PATENT OFFICE.

CHARLES M. GARDNER, OF GARDNERS, PENNSYLVANIA.

RIM EXPANDING AND CONTRACTING DEVICE.

Application filed June 1, 1928. Serial No. 282,176.

This invention relates to a device for retracting and expanding tire rims so as to enable the rim to be easily and quickly placed on a tire or removed therefrom, the general object of the invention being to provide a pair of jaw carrying members for engaging a rim, one on each side of the split therein, with a pair of levers which are so arranged that the movement of one lever will act to force the members apart and thus expand the tire and the other lever acting to lift one of the members to pull one end of the rim inwardly and cause it to overlap the other end, thus contracting the rim to enable the rim to be removed from a tire, the operation of placing a rim on a tire being reversed to the operation of removing the rim from the tire.

Another object of the invention is to make the jaws adjustable so that the device can be used on different sizes and makes of rims.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the device in use.

Figure 2 is a view showing the parts in a position with the rim expanded.

Figure 3 is a view showing the parts in a position with the rim contracted and its ends overlapping.

Figure 4 is a section on line 4—4 of Figure 2.

Figure 5 is a plan view of one member of the device attached to a rim.

Figure 6 is a section on line 6—6 of Figure 5.

Figure 7 is a section on line 7—7 of Figure 8.

Figure 8 is a section on line 8—8 of Figure 1.

In these drawings, the numerals 1 and 2 indicate a pair of substantially U-shaped members, each member being formed with an enlarged base 3 for engaging a part of the inner face of a rim and a plate 4 is slidably mounted between the limbs of each member, a spring actuated jaw 5 being pivotally connected with each end of each plate. These jaws are adapted to engage the edges of a rim and they are provided with handle portions 5' so that they can be pushed outwardly against the action of their springs 6 to free them of the rim. A bolt 7 is rotatably supported by the bight of each member and the threaded portion of each bolt passes through a threaded hole 8 in each plate so that by rotating the bolt, the plate is moved inwardly or outwardly according to the direction of turning movement of the bolt to permit the plate to be adjusted so that the jaws can be set to engage the edges of a rim. An offset arm 9 is carried by the member 1 and this arm has a circular opening therein in which is arranged a disk 10. A lever 11 is eccentrically connected with the disk by a pin 12 and a second pin 13 passes through the lug, the disk and a second lever 14 which is pivoted to the member 2 by the pin 15. The pins 12 and 13 are diametrically arranged in the disk 10 and the pin 13 passes through an extension of the lever 14. The outer end of the arm 9 is rounded, with a portion of the rounded edge being formed with the teeth 16 which are adapted to be engaged by the pawl 17 pivoted to the lever 14 and provided with the usual spring 18.

When a rim is to be removed from a tire, the members 1 and 2 are pressed against parts of the inner face of the rim, one on each side of the split therein, as shown in Figure 1, and as the members are pressed against the rim, the jaws will automatically engage the edges of the rim, as shown in Figure 4, it being, of course, understood that the plates have been adjusted by means of the bolts 7 to a point where the jaws will properly engage the edges of the rim. Then the lever 11 is moved upwardly, as shown in Figure 2, so that one member is moved away from the other member to expand the rim and thus space its ends, as shown in Figure 2. This action results from the turning movement of the disk 10 in the arm 9, which acts to cause the pin 13 to move the lever 14 outwardly and thus move the member 2 away from the member 1. Then the lever 14 is raised to swing the member 2 upwardly, which will lift one end of the rim and on the completion of the swinging movement of the lever 14, the member 2 will move toward the member 1 and thus cause one end of the rim to overlap the other, as shown in Figure 3. The parts will be held in this position by the pawl 7 engaging the teeth 6. Thus the rim is contracted and can be easily removed from the tire.

When the rim is to be placed on the tire, the lever 14 is moved from the position it occupies in Figure 3 to the position it occupies in Figures 1 and 2, it being understood that before this movement can take place, the pawl must be removed from the teeth. This reverse movement of the lever 14 will expand the rim and if the ends should still overlap or if the locking means of the rim should not be in locking position, it is simply necessary to swing upwardly the lever 11, which has been returned to its lowered position by the upward swinging movement of the lever 14 during the operation of contracting the rim, and this movement of the lever 11 will push the member 2 away from the member 1 and thus cause one end of the rim to be forced into place and the locking means of the rim to move into locking position. Thus I have provided simple means for contracting and expanding a rim so that the rim can be easily removed from a tire and placed on a tire.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A rim expanding and contracting device comprising a pair of members, rim engaging jaws carried by each member, a lever carried by each member and eccentric means for connecting the levers together whereby the movement of one lever will act to force the members apart to expand a rim and the movement of the other lever will act to move one end of a rim out of alignment with the other end and the further movement of said lever will move the members toward each other to contract the rim.

2. A rim contracting and expanding device comprising a pair of members, rim engaging jaws carried by each member, an arm on one member, a disk rotatably carried by said arm, a lever eccentrically pivoted to the disk, a second lever pivotally connected with the second member, an eccentrically arranged pivot for connecting the disk with both levers and ratchet means for holding the second lever in adjusted position.

3. A rim contracting and expanding device comprising a pair of members, rim engaging jaws carried by each member, means for adjusting the jaws to suit different sizes of rims, an arm on one member, a disk rotatably carried by said arm, a lever eccentrically pivoted to the disk, a second lever pivotally connected with the second member, an eccentrically arranged pivot for connecting the disk with both levers and ratchet means for holding the second lever in adjusted position.

In testimony whereof I affix my signature.

CHARLES M. GARDNER.